(12) United States Patent
Van Den Heuvel et al.

(10) Patent No.: US 6,937,620 B2
(45) Date of Patent: Aug. 30, 2005

(54) TRANSMISSION SYSTEM, TRANSMITTER AND RECEIVER

(75) Inventors: Sebastiaan Antonius Fransiscus Arnoldus Van Den Heuvel, Eindhoven (NL); Mark Henricus Verberkt, Eindhoven (NL); Leendert Teunis Rozendaal, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 661 days.

(21) Appl. No.: 09/761,246

(22) Filed: Jan. 16, 2001

(65) Prior Publication Data

US 2001/0021172 A1 Sep. 13, 2001

(30) Foreign Application Priority Data

Jan. 14, 2000 (EP) .............................................. 00200132

(51) Int. Cl.⁷ .............................. H04J 1/00; H04H 1/04
(52) U.S. Cl. ......................................... 370/487; 725/121
(58) Field of Search ................................ 370/227, 225, 370/226, 222, 223, 224, 485, 486, 487, 488, 490, 493, 537, 221; 725/34, 35, 37, 46, 64, 65, 86, 105, 121

(56) References Cited

U.S. PATENT DOCUMENTS

| | | | | |
|---|---|---|---|---|
| 6,563,515 B1 | * | 5/2003 | Reynolds et al. | ............ 345/721 |
| 6,598,229 B2 | * | 7/2003 | Smyth et al. | ................ 725/107 |
| 6,606,746 B1 | * | 8/2003 | Zdepski et al. | ................ 725/37 |
| 6,718,552 B1 | * | 4/2004 | Goode | .......................... 725/95 |

FOREIGN PATENT DOCUMENTS

EP          0963115 A1    12/1999   ......... H04N/7/173

OTHER PUBLICATIONS

"(Breaking open the set top box" by David Banks, Anthony Wiley et al (Proceedings of the SPIE, The International Society for Optical Engineering 1998, vol., No. 3228, pp 105–116).

* cited by examiner

Primary Examiner—Brian Nguyen

(57) ABSTRACT

Transmission system for transmitting an MPEG-2 transport stream from a transmitter (10) to a receiver (14), provided with a return channel (16) through which the receiver (14) can transmit selection criteria for the selection of MPEG-2 sections to the transmitter (10). The transmitter (10) has a selector (38) which receives the desired criteria and then filters the sections according to these criteria before transmission.

1 Claim, 1 Drawing Sheet

TRANSMISSION SYSTEM, TRANSMITTER AND RECEIVER

The invention relates to a transmission system for transmitting a multiplex signal from a transmitter to a receiver via a transmission channel, in which the multiplex signal has a plurality of information sections comprising information about the multiplex signal, and in which the transmission system is provided with a return channel from the receiver to the transmitter.

The invention also relates to a transmitter for transmitting a multiplex signal via a transmission channel, in which the multiplex signal has a plurality of information sections comprising information about the multiplex signal.

The invention further relates to a receiver for receiving a multiplex signal from a transmitter, in which the multiplex signal has a plurality of information sections comprising information about the multiplex signal, and in which the receiver is provided with a connection for a return channel from the receiver to the transmitter.

The invention further relates to a method of transmitting a multiplex signal from a transmitter to a receiver via a transmission channel, in which the multiplex signal has a plurality of information sections comprising information about the multiplex signal, and in which the transmission system is provided with a return channel from the receiver to the transmitter.

A transmission system of the type described in the opening paragraph is known from the article "Breaking open the set top box" by David Banks, Anthony Wiley et al (Proceedings of the SPIE, The International Society for Optical Engineering 1998, vol. no. 3228, pp. 105–116).

Transmission systems for transmitting video, audio and other signals are often coded in accordance with the MPEG-2 standard. The signals to be transmitted are coded to form elementary streams. These streams are subsequently combined (multiplexed) for transmission and thus constitute a transport stream. A transport stream is composed of packets. A packet may comprise a part of an elementary stream and is then provided with the Program Identifier (PID) of the relevant elementary steam. The elementary stream can be reconstructed from the separate packets by means of the PID. A packet may also have an information section comprising information about the elementary streams such as, for example, the association between a program and the associated elementary streams with the audio and video information of this program, or, for example, the entitlement management and control messages. The transmitter transmits the entire transport stream to the receiver which can subsequently reconstruct the elementary streams by means of the PIDs, read the information sections and reconstruct the desired signals for the user.

A drawback of such a system is that the quantity of data traffic is always equally large, even when the user needs only one elementary stream. The system as described in Banks et al solves this problem by making use of a return channel through which the receiver can pass on the desired PIDs of the elementary streams to the transmitter. The transmitter then selects the packets comprising one of these PIDs and transmits only these packets to the receiver. A saving of the bandwidth used is thereby obtained.

A drawback of this system is that only the desired elementary streams are selected. The information sections which are also transmitted are repeated at regular instants, even when the relevant information is unmodified with respect to the previously transmitted section or when the receiver does not need this section. This means that there is still a waste of bandwidth.

It is an object of the invention to provide a transmission system of the type described in the opening paragraph in which a further saving of bandwidth is obtained.

According to the invention, this object is achieved in the transmission system which is characterized in that the receiver has section selection means for submitting a criterion for filtering information sections to the transmitter via the return channel and in that the transmitter has section filtering means for filtering information sections according to the submitted criterion and networking means for transmitting the information sections that satisfy the criterion.

In this transmission system, the receiver can indicate which information sections it needs. The transmitter can filter out the unwanted information sections from the transport stream according to the submitted criterion. Since information sections are normally repeated regularly, a satisfactory saving of bandwidth is obtained with this system.

An embodiment is characterized in that the section filtering means are arranged for at least one of positive and negative filtering. Both methods of filtering have their own advantages. Which one to choose depends on the type of information that needs to be filtered. Using positive filtering, only the information that matches the given criterion is selected and transmitted to the receiver. When using negative filtering, only the information that does not match the given criterion satisfies it.

A further embodiment is characterized in that the networking means are arranged for transmitting the selected information sections via an additional transmission channel. This embodiment has the advantage that the receiver does not need to select the information sections from the transport stream, which is a time-consuming operation due to the large quantity of packets of the elementary streams therein.

It is also an object of the invention to provide a transmitter of the type described in the opening paragraph, in which a further saving of bandwidth is obtained.

According to the invention, this object is achieved in a transmitter which is characterized in that the transmitter has section filtering means for filtering information sections according to the submitted criterion and networking means for transmitting information sections that satisfy the criterion. The transmitter can filter out the unwanted information sections from the transport stream according to the submitted criterion. Since information sections are normally repeated regularly, a satisfactory saving of bandwidth is obtained with this system.

An embodiment of the transmitter is characterized in that the section filtering means are arranged for at least one of positive and negative filtering. Both methods of filtering have their own advantages. Which one to choose depends on the type of information that needs to be filtered. Using positive filtering, only the information that matches the given criterion is selected and transmitted to the receiver. When using negative filtering, only the information that does not match the given criterion satisfies it.

A further embodiment of the transmitter is characterized in that the section filtering means are arranged for adding the submitted filtering criterion to a collection of criteria in response to receiving said submitted filtering criterion. Using this collection, the transmitter can easily apply multiple criteria on a single transport stream. The collection can e.g. be realized using a memory or buffer of some kind on the transmitter.

A further embodiment of the transmitter is characterized in that the section filtering means are arranged for removing a criterion from the collection after filtering a single information section that satisfies said criterion. In this embodiment, a receiver can submit a filtering criterion that will match at most one information section. By using, for instance, a negative filter that filters out all information sections, he can effectively block the transmission of all sections. He can then submit a positive filtering criterion that is to be used only once when he needs the information in a particular section. The transmitter will then filter that section and transmit it to the receiver, and then remove the criterion so no further sections are transmitted. This is a very effective way of saving bandwidth.

A further embodiment of the transmitter is characterized in that the section filtering means are arranged for removing a criterion from the collection when a revocation request is received for said criterion. The revocation request can be sent e.g. by the receiver. This allows the receiver to revoke any criteria it submitted previously.

It is also an object of the invention to provide a receiver of the type described in the opening paragraph, in which a further saving of bandwidth is obtained.

According to the invention, this object is achieved in a receiver which is characterized in that the receiver has section selection means for submitting a criterion for filtering information sections to the transmitter via the return channel.

An embodiment of the receiver is characterized in that the section selection means are arranged for sending a revocation request specifying a particular criterion to the transmitter for causing the transmitter to stop filtering information sections according to the particular criterion.

It is also an object of the invention to provide a method of the type described in the opening paragraph, which obtains a further saving of bandwidth.

According to the invention, this object is achieved in a method which is characterized in that the receiver submits a criterion for filtering information sections to the transmitter via the return channel and in that the transmitter filters information sections according to the submitted criterion and transmits the information sections that satisfy the criterion.

These and other aspects of the invention are apparent from and will be elucidated with reference to the embodiments described hereinafter.

In the drawings.

Throughout the figures, same reference numerals indicate similar or corresponding features. Some of the features indicated in the drawings are typically implemented in software, and as such represent software entities, such as software modules or objects.

Figure 1:
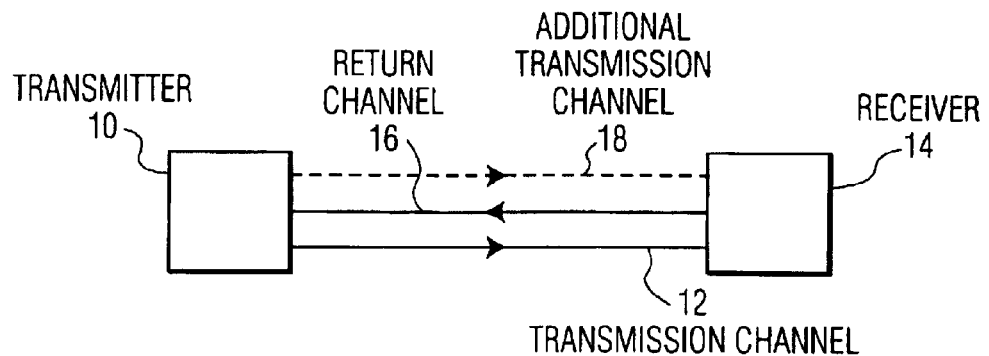
FIG. 1 shows diagrammatically a transmission system according to the invention.

The transmission system of FIG. 1 comprises a transmission channel 12 for transmitting a multiplex signal from a transmitter 10 to a receiver 14. In the embodiment shown in FIG. 1, the multiplex signal is an MPEG-2 transport stream. In addition to a variety of elementary streams, the transport stream comprises a plurality of information sections comprising information about the elementary streams. These information sections comprise, for example, the Program Map Table (PMT) in which the relation between each program in the transport stream and the PIDs of the associated audio and video signals is laid down, or the Conditional Access Table (CAT) which comprises the entitlement and management information with which access to given streams is limited to authorized users.

The transmission system is also provided with a return channel 16 from the receiver 14 to the transmitter 10. This return channel may be, for example, an Internet connection or may be adapted as a separate channel through the same medium as that through which the transmission channel is realized.

Figure 2:
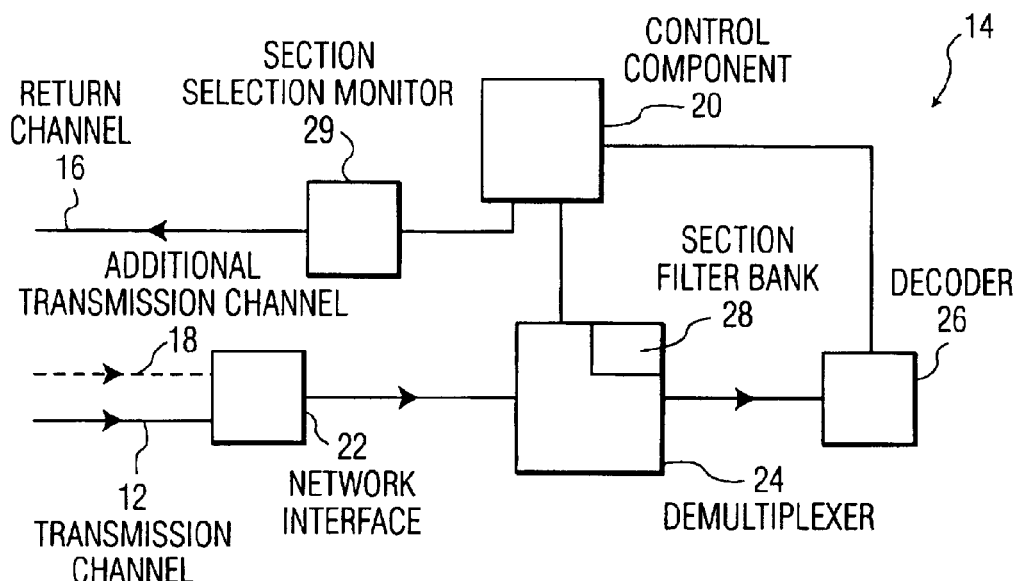
FIG. 2 shows diagrammatically a receiver according to the invention.
Figure 3:
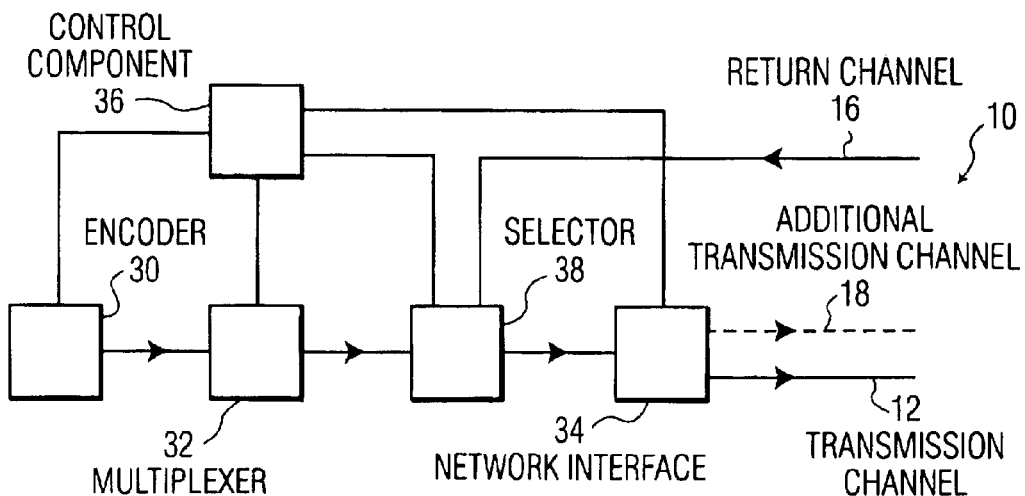
FIG. 3 shows diagrammatically a transmitter according to the invention.

As will be apparent from the description of FIGS. 2 and 3, the receiver is adapted to transmit a criterion for selecting at least one information section to the transmitter via the return channel, which transmitter is adapted to select information sections satisfying the received criterion and to transmit the information sections thus selected.

In a particular embodiment, the transmission system is also provided with an additional transmission channel 18 through which the transmitter 10 can transmit the selected information sections to the receiver. Now, the receiver 14 does not need to select the information sections from the transport stream, which is a time-consuming operation due to the large quantity of packets of the elementary streams therein.

In FIG. 2, the receiver is provided with a control component 20, a network interface 22, a demultiplexer 24 and a decoder 26. A transport stream presented through the transmission channel 12 is received by the network interface 22 and transmitted to the demultiplexer 24. This demultiplexer reconstructs the individual elementary streams and presents them to the decoder 26. The demultiplexer 24 also comprises a section filter bank 28 in which information sections are retrieved from the transport stream so that these can be processed separately. The control component 20 controls and checks the other components of the receiver.

The receiver may be, for example, a set top box connected to a television set with which a user can receive video, audio and other signals. The receiver is also provided with a section selection monitor 29 which generates criteria for selecting information sections. A possible criterion is the version number of the desired information section. The receiver thereby indicates that it only wants to receive the information section when its version number is higher than the version number as stated in the criterion. Another possible criterion is an instant at which the receiver only wants to receive the information sections made or modified after that instant. Many other criteria are feasible. As will become apparent below, the criteria can be specified in a variety of ways, depending on the type of information that needs to be filtered.

The monitor 29 subsequently sends the generated criteria to a transmitter via the return channel 16. The monitor 29 can also use the return channel 16 to signal to the transmitter that it should stop filtering according to a previously transmitted criterion.

The transmitter shown in FIG. 3 is adapted to transmit a transport stream via a network interface 34 through the transmission channel 12. In the embodiment shown, the transmitter is provided with an encoder 30 which forms a plurality of elementary streams from presented signals, and a multiplexer 32 which combines the elementary streams and the associated information sections to a transport stream. In another embodiment (not shown) the transmitter 10 receives an already constructed transport stream from elsewhere and the transmitter 10 only ensures that this transport stream is transmitted to a receiver 14. Then, it is not necessary to include an encoder 30 and a multiplexer 32 in the transmitter 10.

The transmitter is also provided with a control component 36 and a selector 38 which can receive a plurality of criteria via the return channel 16. The control component 36 controls and checks the other components of the transmitter. The selector 38 is positioned between the multiplexer 32 and the network interface 34 and only passes information sections that satisfy one or more received criteria.

A filtering criterion may be applied once or multiple times. Using the criterion only once allows for the selection of a single information section. This will be discussed in more detail below. Continuous filtering makes it possible to obtain one or more information sections that satisfy the given criterion until some condition is met, e.g. when the receiver signals the filtering should stop.

Filtering can be done using various levels of granularity for the criterion. At the minimum, the PID of an elementary stream from which sections are to be filtered needs to be specified. The filtering can be made more specific by adding an identifier for an information section or table which is to be filtered specifically in that elementary stream.

More advanced filtering criteria can be realized using positive and negative filtering. Using positive filtering, only the information that matches the given criterion is selected and transmitted to the receiver. When using negative filtering, only the information that does not match the given criterion satisfies it.

In particular, positive and negative filtering can be realized at the bit level by specifying the criterion as a mask which is to be applied using a bitwise AND operation to the information section to be filtered. If the output of the application of the mask matches an outcome given in the criterion, the information section matches the criterion. Depending on whether the type of filtering was positive or negative, the section is then selected or filtered out. It may be necessary to indicate in the criterion an offset at which to start applying the mask.

In the embodiment shown in the drawing, the resultant transport stream is subsequently transmitted by the network interface 34 to the receiver via the transmission channel 12. In another embodiment (not shown), the selector 38 removes all information sections that do not satisfy one of the received criteria from the transport stream. The information sections that satisfy the criteria are passed on to the network interface 34 which transmits them to the receiver via an additional transmission channel 18.

The selector 38 is preferably arranged to maintain a collection of criteria that have been submitted by one or more receivers previously. The selector 38 can then filter all information sections according to the criteria in the collection. The collection can e.g. be realized using a memory or buffer of some kind on the transmitter.

Receivers can send a revocation request to the selector 38 that a particular criterion should no longer be used. The selector 38 then removes it from the collection. Criteria may also be removed because of other reasons, e.g. because a criterion has a limited lifetime and this lifetime has been exceeded.

A criterion may also be removed from the collection when it has been used to filter a single information section. The receiver 14 can submit, for instance, a negative filter that filters out all information sections. This way, he can effectively block the transmission of all sections. The receiver 14 can then submit a positive filtering criterion that is to be used only once when he needs the information in a particular section. The transmitter 10 will then filter that section and transmit it to the receiver, and then remove the criterion so no further sections are transmitted. This is a very effective way of saving bandwidth.

What is claimed is:

1. A transmission system for transmitting a multiplex signal from a transmitter to a receiver via a transmission channel, in which the multiplex signal has a plurality of information sections comprising information about the multiplex signal, and in which the transmission system is provided with a return channel from the receiver to the transmitter, wherein the receiver has section selection means for submitting a criterion for filtering information sections to the transmitter via the return channel and in that the transmitter has section filtering means for filtering information sections according to the submitted criterion and networking means for transmitting the information sections that satisfy the criterion, wherein the networking means are arranged for transmitting selected information sections via an additional transmission channel.

* * * * *